(12) United States Patent
Hong et al.

(10) Patent No.: US 11,071,137 B2
(45) Date of Patent: Jul. 20, 2021

(54) DATA TRANSMISSION METHOD AND DEVICE, AND COMPUTER-READABLE STORAGE MEDIUM

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/233,376

(22) Filed: Dec. 27, 2018

(65) Prior Publication Data

US 2019/0132863 A1 May 2, 2019

Related U.S. Application Data

(63) Continuation of application No. PCT/CN2016/087886, filed on Jun. 30, 2016.

(51) Int. Cl.
*H04W 4/00* (2018.01)
*H04W 72/14* (2009.01)
*H04W 28/10* (2009.01)
*H04W 72/12* (2009.01)
*H04W 28/02* (2009.01)
(Continued)

(52) U.S. Cl.
CPC ....... *H04W 72/14* (2013.01); *H04W 28/0236* (2013.01); *H04W 28/0278* (2013.01); *H04W 28/0284* (2013.01); *H04W 28/08* (2013.01); *H04W 28/10* (2013.01); *H04W 48/06* (2013.01); *H04W 72/1284* (2013.01);
(Continued)

(58) Field of Classification Search
None
See application file for complete search history.

(56) References Cited

U.S. PATENT DOCUMENTS

2014/0079007 A1 3/2014 Li
2014/0086211 A1 3/2014 Liu
(Continued)

FOREIGN PATENT DOCUMENTS

CN 102811465 A 12/2012
CN 103987088 A 8/2014
(Continued)

OTHER PUBLICATIONS

International Search Report (including English translation) and Written Opinion issued in PCT/CN2016/087886, dated Mar. 23, 2017, 8 pages.
(Continued)

*Primary Examiner* — Zewdu A Beyen
(74) *Attorney, Agent, or Firm* — Arch & Lake LLP

(57) ABSTRACT

A data transmission method and device are provided. The method includes: receiving a BSR sent by a terminal; receiving information about a currently accessed WLAN AP sent by the terminal; determining, according to the information about the WLAN AP, the amount of data to be transmitted by the terminal through a LTE network; and sending a UL Grant to the terminal, so that the terminal may determine, according to the U Grant, the amount of data to be transmitted via the LTE network, and the then transmit data via the LTE network and a WLAN network.

10 Claims, 6 Drawing Sheets

(51) Int. Cl.
*H04W 28/08* (2009.01)
*H04W 48/06* (2009.01)
*H04W 84/12* (2009.01)

(52) U.S. Cl.
CPC .... *H04W 72/1231* (2013.01); *H04W 72/1289* (2013.01); *H04W 84/12* (2013.01)

(56) References Cited

U.S. PATENT DOCUMENTS

| | | | |
|---|---|---|---|
| 2014/0293970 A1 | 10/2014 | Damnjanovic et al. | |
| 2014/0321376 A1* | 10/2014 | Damnjanovic ... | H04W 72/1215 370/329 |
| 2015/0289193 A1* | 10/2015 | Uchino ............ | H04W 40/16 370/235 |
| 2016/0072668 A1* | 3/2016 | Zeng ............... | H04W 72/12 370/254 |
| 2016/0295466 A1* | 10/2016 | da Silva ........... | H04W 36/0066 |
| 2017/0086093 A1 | 3/2017 | Chen | |

FOREIGN PATENT DOCUMENTS

| | | | |
|---|---|---|---|
| CN | 104244331 A | 12/2014 | |
| CN | 104918232 A | 9/2015 | |
| CN | 105247920 A | 1/2016 | |
| CN | 105704759 A | 6/2016 | |
| WO | 2011157129 A2 | 12/2011 | |
| WO | WO-2016163938 A1 * | 10/2016 | ........ H04W 36/0027 |
| WO | WO-2017192171 A1 * | 11/2017 | ........ H04W 72/1284 |

OTHER PUBLICATIONS

First Office Action issued to Chinese Application No. 2016800006999 dated Aug. 5, 2020 with English translation, (20p).

Huawei, Uplink bearer configuration and BSR procedure for eLWA; 3GPP TSG-RAN WG2 Meeting #94 R2-163777, May 27, 2016, (3p).

* cited by examiner

DATA TRANSMISSION METHOD AND DEVICE, AND COMPUTER-READABLE STORAGE MEDIUM

CROSS-REFERENCE TO RELATED APPLICATIONS

This application is a continuation application of International Application No. PCT/CN2016/087886, filed on Jun. 30, 2016, the entire contents of which are incorporated herein by reference.

TECHNICAL FIELD

The present disclosure relates to the field of wireless communication technologies, and in particular, to a data transmission method and device.

BACKGROUND

With the development of wireless communication technologies, the amount of multimedia services is increasing, and the number of wireless users is also increasing. In addition, the users are increasingly demanding on the speed and continuity of networks, resulting in a more evident contradiction between the increasing wireless demands and limited authorized spectrum resources.

SUMMARY

The present disclosure provides a data transmission method and device. The technical solutions are as follows.

According to a first aspect of the present disclosure, there is provided a data transmission method applied to a base station, the method comprising: receiving a buffer status report (BSR) sent by a terminal, the BSR indicating an amount of data required to be transmitted by the terminal; receiving information about a currently accessed wireless local area network (WLAN) access point (AP) sent by the terminal, the WLAN AP and the base station belonging to the same network operator; determining an amount of data transmitted by the terminal through a long term evolution (LTE) network according to the information about the WLAN AP; and sending a UL Grant to the terminal, wherein the UL Grant indicates the amount of data transmitted by the terminal through the LTE network, and the terminal is configured to determine the amount of data to be transmitted via the LTE network according to the UL Grant, subtract the amount of the data to be transmitted via the LTE network from the amount of the data required to be transmitted by the terminal to obtain an amount of data to be transmitted via a WLAN, and transmit data through the LTE network and the WLAN.

According to a second aspect of the present disclosure, there is provided a data transmission method applied to a terminal, the method comprising: sending a buffer status report (BSR) to a base station, the BSR indicating an amount of data required to be transmitted by the terminal; sending information about a currently connected wireless local area network (WLAN) access point (AP) to the base station, the WLAN AP and the base station belonging to the same network operator; receiving a UL Grant sent by the base station, the UL Grant indicating an amount of data transmitted by the terminal through an LTE network; determining the amount of data to be transmitted via the LTE network and an amount of to be data transmitted via the WLAN according to the UL Grant, wherein a sum of the amount of data to be transmitted via the LTE network and the amount of to be data transmitted via the WLAN is equal to the amount of data required to be transmitted by the terminal; and transmitting data through the LTE network and the WLAN.

According to a third aspect of the present disclosure, there is provided a data transmission device applied to a base station, the device comprising: a first receiving module configured to receive a buffer status report (BSR) sent by a terminal, the BSR indicating an amount of data required to be transmitted by the terminal; a second receiving module configured to receive information about a currently accessed wireless local area network (WLAN) access point (AP) sent by the terminal, the WLAN AP and the base station belonging to the same network operator; a data amount determining module configured to determine an amount of data transmitted by the terminal through a long term evolution (LTE) network according to the information about the WLAN AP; and a sending module configured to send a UL Grant to the terminal, wherein the UL Grant indicates the amount of data transmitted by the terminal through the LTE network, and the terminal is configured to determine the amount of data to be transmitted via the LTE network according to the UL Grant, subtract the amount of data to be transmitted via the LTE network from the amount of data required to be transmitted by the terminal to obtain an amount of data to be transmitted via the WLAN, and transmit data through the LTE network and the WLAN.

According to a fourth aspect of the present disclosure, there is provided a data transmission device applied to a terminal, the device comprising: a first sending module configured to send a buffer status report (BSR) to a base station, the BSR indicating an amount of data required to be transmitted by the terminal; a second sending module configured to send information about a currently connected wireless local area network (WLAN) access point (AP) to the base station, the WLAN AP and the base station belonging to the same network operator; a receiving module configured to receive a UL Grant sent by the base station, the UL Grant indicating an amount of data transmitted by the terminal through an LTE network; a data amount determining module configured to determine the amount of data to be transmitted via the LTE network and an amount of data to be transmitted via the WLAN according to the UL Grant, wherein a sum of the amount of data to be transmitted via the LTE network and the amount of data to be transmitted via the WLAN is equal to the amount of data required to be transmitted by the terminal; and a data transmission module configured to transmit data through the LTE network and the WLAN.

According to a fifth aspect of the present disclosure, there is provided a data transmission device, comprising: a processor; and a memory for storing instructions executable by the processor; wherein the processor is configured to: receive a buffer status report (BSR) sent by a terminal, the BSR indicating an amount of data required to be transmitted by the terminal; receive information about a currently accessed wireless local area network (WLAN) access point (AP) sent by the terminal, the WLAN AP and a base station belonging to the same network operator; determine an amount of data transmitted by the terminal through a long term evolution (LTE) network according to the information about the WLAN AP; and send a UL Grant to the terminal, wherein the UL Grant indicates the amount of data transmitted by the terminal through the LTE network, and the terminal is configured to determine the amount of data to be transmitted via the LTE network according to the UL Grant, subtract the amount of data to be transmitted via the LTE network from the amount of data required to be transmitted by the terminal to obtain an amount of data to be transmitted via the WLAN, and transmit data through the LTE network and the WLAN.

According to a sixth aspect of the present disclosure, there is provided a data transmission device, comprising: a processor; and a memory for storing instructions executable by the processor; wherein the processor is configured to: send a buffer status report (BSR) to a base station, the BSR indicating an amount of data required to be transmitted by the terminal; send information about a currently connected wireless local area network (WLAN) access point (AP) to the base station, the WLAN AP and the base station belonging to the same network operator; receive a UL Grant sent by the base station, the UL Grant indicating an amount of data transmitted by the terminal through an LTE network; determine the amount of the data to be transmitted via the LTE network and an amount of data to be transmitted via the WLAN according to the UL Grant, wherein a sum of the amount of data to be transmitted via the LTE network and the amount of data to be transmitted via the WLAN is equal to the amount of data required to be transmitted by the terminal; and transmit data through the LTE network and the WLAN.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
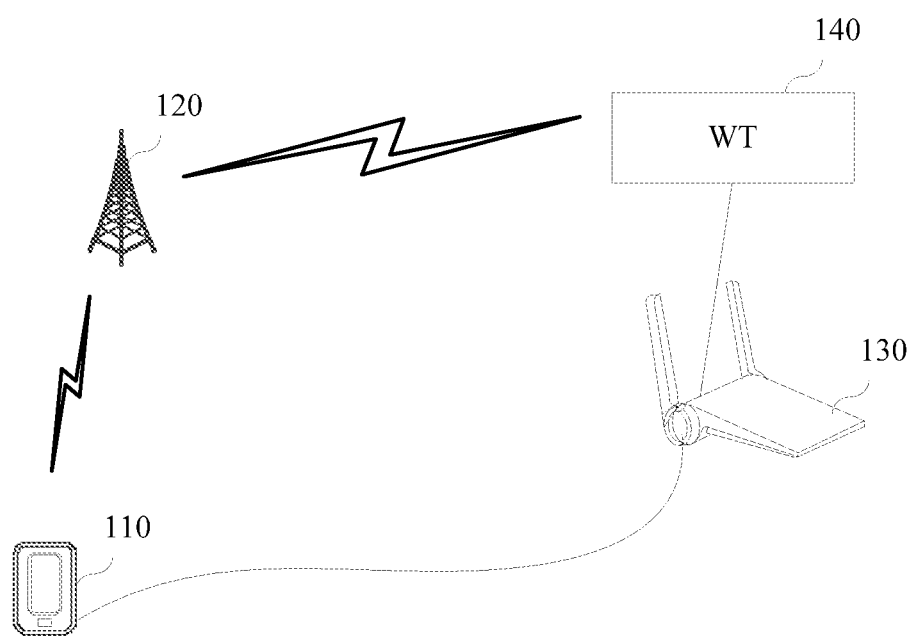
FIG. 1 is a schematic diagram of a structure of a data transmission system according to an example of the present disclosure.

FIG. 1 shows a schematic diagram of a structure of a data transmission system according to an example of the present disclosure. The data transmission system includes a terminal 110, a base station 120, a WLAN AP (Wireless Local Area Networks Access Point) 130, and a WT (WLAN Termination) 140.

The terminal 110 can transmit data. Optionally, the terminal 110 is a terminal device in an LTE (Long Term Evolution) network. Optionally, the terminal 110 is a mobile station, a mobile, a user terminal, a user device, or user equipment (UE), such as a mobile phone, a tablet computer, a smart appliance, etc. Optionally, the terminal 110 can simultaneously access the LTE network and the WLAN, and simultaneously transmit data through the LTE network and the WLAN.

The base station 120 can transmit data. For example, the base station 120 is an eNB (evolutional Node B) in the LTE network.

Optionally, the terminal 110 and the base station 120 communicate via wireless carrier waves.

The WLAN AP 130 can transmit data, and is a WLAN access device deployed by a network operator on an unauthorized spectrum. The WLAN AP 130 and the base station 110 belong to the same network operator.

Optionally, after being connected with the WLAN AP 130, the terminal 110 can access the WLAN provided by the WLAN AP 130.

The WT 140 can transmit data, and is configured to provide a network parameter of the WLAN and to control the WLAN AP 130.

Optionally, the base station 120 interacts with the WT 140 through a standardized interface. For example, the base station 120 interacts with the WT 140 through an Xw interface in an LTE standard or other standard.

Optionally, the data transmission system shown in FIG. 1 may include a plurality of terminals 110, and/or a plurality of base stations 120, and/or a plurality of WLAN APs 130, and/or a plurality of WTs 140. One terminal 110 may communicate with a plurality of base stations 120. One WT 140 may control a plurality of WLAN APs 130. One WLAN AP 130 may be connected with a plurality of terminals 110. Only one terminal 110, one base station 120, one WLAN AP 130 and one WT 140 are taken as an example for illustration in FIG. 1, which is not limited in this embodiment.

Figure 2:
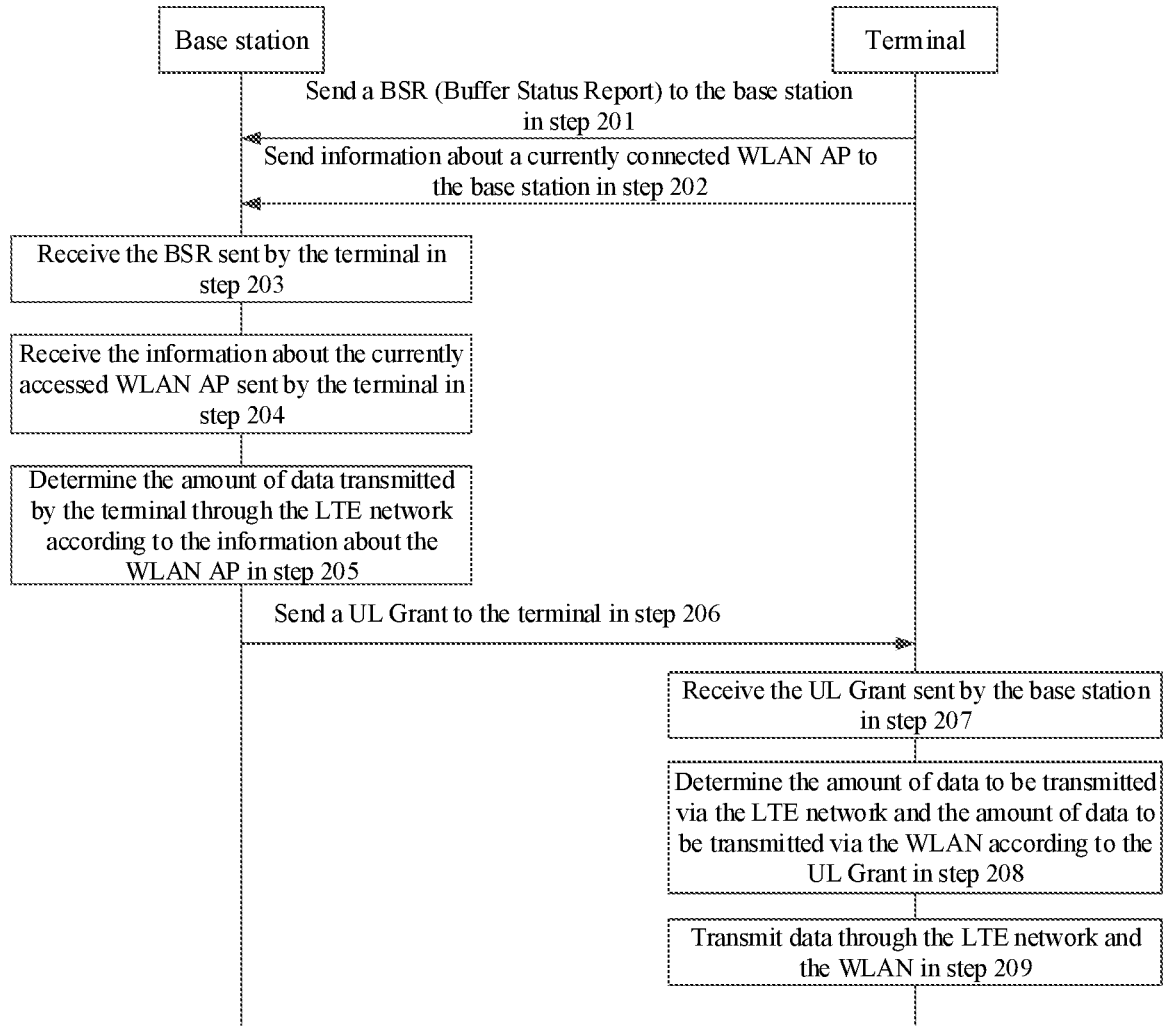
FIG. 2 is a flow chart of a data transmission method according to an example of the present disclosure.

FIG. 2 shows a flow chart of a data transmission method according to an example of the present disclosure. The data transmission method is applied to the data transmission system described in FIG. 1. As shown in FIG. 2, the data transmission method may include following steps.

In step 201, the terminal sends a BSR (Buffer Status Report) to the base station.

The terminal sends the BSR to the base station in a signaling manner. The BSR indicates the amount of data in a data packet required to be transmitted by the terminal.

In step 202, the terminal sends information about a currently connected WLAN AP to the base station.

The terminal sends the information about the WLAN AP currently connected with the terminal to the base station. The WLAN AP currently connected with the terminal and the base station belong to the same network operator.

It should be noted that this step and step 201 may be simultaneously performed.

In step 203, the base station receives the BSR sent by the terminal.

In step 204, the base station receives the information about the currently accessed WLAN AP sent by the terminal.

It should be noted that this step and step 203 may be simultaneously performed.

In step 205, the base station determines the amount of data transmitted by the terminal through the LTE network according to the information about the WLAN AP.

In step 206, the base station sends a UL Grant (Uplink Grant) to the terminal.

The UL Grant indicates the amount of data transmitted by the terminal through the LTE network.

In step 207, the terminal receives the UL Grant sent by the base station.

In step 208, the terminal determines the amount of data to be transmitted via the LTE network and the amount of data to be transmitted via the WLAN according to the UL Grant.

The terminal determines the amount of data transmitted via the LTE network according to the UL Grant, and obtains the amount of data to be transmitted via the WLAN by subtracting the amount of data to be transmitted via the LTE network from the amount of data required to be transmitted by the terminal. Here, the sum of the amount of data to be transmitted via the LTE network and the amount of data to be transmitted via the WLAN is equal to the amount of the data required to be transmitted by the terminal.

In step 209, the terminal transmits data through the LTE network and the WLAN.

The terminal transmits the data to the base station through the LTE network, and transmits the data to the WT through the WLAN. The data transmitted by the terminal through the LTE network and the data transmitted by the terminal through the WLAN is different, but belong to the same data packet.

It should be noted that the above steps 201, 202, 207 and 208 may be separately implemented as a method embodiment at the terminal side, and the steps 203-206 may be separately implemented as a method embodiment at the base station side.

In summary, according to the data transmission method provided in the present disclosure, the terminal sends the amount of the data in the data packet required to be transmitted and information about the WLAN AP connected with the terminal to the base station. The base station determines the amount of the data transmitted by the terminal through the LTE network according to the information sent by the terminal, and feeds back the determined amount of the data to the terminal, and the terminal simultaneously transmits the data required to be transmitted on the LTE network and the WLAN according to the data fed back from the base station. Thus, the problem that the terminal cannot determine the amount of data to be transmitted via the LTE network and the amount of data to be transmitted via the WLAN when updating data is solved. Therefore, when updating data every time, the terminal can determine the amount of data to be transmitted via the LTE network and the amount of data to be transmitted via the WLAN according to the actual situation.

Figure 3:
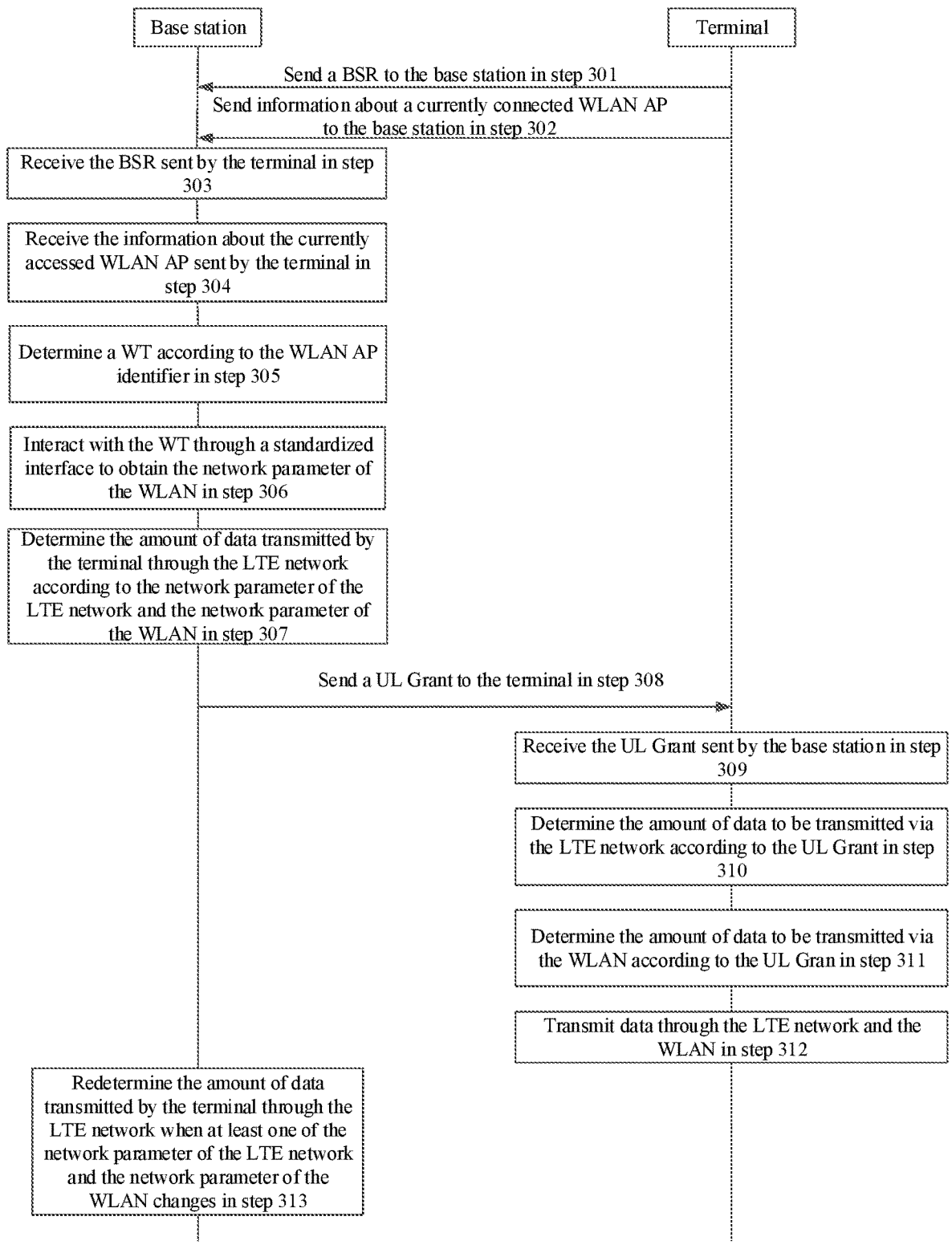
FIG. 3 is a flow chart of a data transmission method according to another example of the present disclosure.

FIG. 3 shows a flow chart a data transmission method according to an example of the present disclosure. The data transmission method is applied to the data transmission system as described in FIG. 1. As shown in FIG. 3, the data transmission method may include following steps.

In step 301, the terminal sends a BSR to the base station.

The terminal sends the BSR to the base station in a signaling manner. The BSR indicates the amount of data in a data packet required to be transmitted by the terminal.

In step 302, the terminal sends information about a currently connected WLAN AP to the base station. The terminal sends the information about the WLAN AP currently connected with the terminal to the base station. The WLAN AP currently connected with the terminal and the base station belong to the same network operator.

The information about the WLAN AP at least includes a WLAN AP identifier.

It should be noted that this step and step 301 may be simultaneously performed.

In step 303, the base station receives the BSR sent by the terminal.

In step 304, the base station receives the information about the currently accessed WLAN AP sent by the terminal.

It should be noted that this step and step 303 may be simultaneously performed.

In step 305, the base station determines a WT according to the WLAN AP identifier.

The WT provides the network parameter of the WLAN to the base station.

The network parameter incudes at least one of following parameters: a load and link quality. For example, the network parameter incudes the load, or the link quality, or both the load and the link quality.

In step 306, the base station interacts with the WT through a standardized interface to obtain the network parameter of the WLAN.

By interacting with the WT through the standardized interface, the base station can obtain the network parameter of the WLAN provided by the WT, and the WT can also obtain the network parameter of the LTE network provided by the base station.

In step 307, the base station determines the amount of data transmitted by the terminal through the LTE network according to the network parameter of the LTE network and the network parameter of the WLAN.

There are two implementations for this step.

1. When the network parameter includes a load, the base station determines the amount of data transmitted by the terminal through the LTE network according to the relationship between the load of the LTE network and the load of the WLAN.

The value of the load is negatively correlated with the amount of the transmitted data. The more the load is, the less the amount of the transmitted data is. The fewer the load is, the larger the amount of the transmitted data is.

Optionally, the base station determines the amount of data transmitted by the terminal through the LTE network according to the proportional relationship between the load of the LTE network and the load of the WLAN. For example, if the amount of data required to be transmitted by the terminal is 100 MB, the load of the LTE network is 20 MB, the load of the WLAN is 60 MB, and the ratio of the load of the LTE to the load of the WLAN is 1:3, the base station determines that the amount of data transmitted by the terminal through the LTE network is 25 MB.

2. When the network parameter includes link quality, the base station determines the amount of data transmitted by the terminal through the LTE network according to the relationship between the link quality of the LTE network and the link quality of the WLAN.

Here, the link quality is positively correlated with the amount of the transmitted data. The higher the link quality is, the larger the amount of the transmitted data is. The poorer the link quality is, the smaller the amount of the transmitted data is.

It should be noted that after interacting with the WT, the base station can obtain the amount of the data transmitted by the terminal through the LTE network and the amount of the data transmitted by the terminal through the WLAN, and the WT can also obtain the amount of the data transmitted by the terminal through the LTE network and the amount of the data transmitted by the terminal through the WLAN.

In step 308, the base station sends a UL Grant to the terminal.

The UL Grant indicates the amount of the data transmitted by the terminal through the LTE network.

In step 309, the terminal receives the UL Grant sent by the base station.

In step 310, the terminal determines the amount of data to be transmitted via the LTE network according to the UL Grant.

In step 311, the terminal determines the amount of data to be transmitted via the WLAN according to the UL Grant.

The terminal obtains the amount of the data to be transmitted via the WLAN by subtracting the amount of the data to be transmitted via the LTE network from the amount of the data required to be transmitted by the terminal.

It should be noted that this step and step 310 may be simultaneously performed.

In step 312, the terminal transmits data through the LTE network and the WLAN.

The terminal transmits data to the base station through the LTE network, and transmits data to the WT through the WLAN. The data transmitted by the terminal through the LTE network and the data transmitted by the terminal through the WLAN is different, but belong to the same data packet.

In step 313, when at least one of the network parameter of the LTE network and the network parameter of the WLAN changes, the base station redetermines the amount of data transmitted by the terminal through the LTE network.

When the network parameter of the LTE network changes, or the network parameter of the WLAN changes, or both the network parameter of the LTE network and the network parameter of the WLAN change, the base station redetermines the amount of the data transmitted by the terminal through the LTE network, and sends the redetermined amount of the data transmitted by the terminal through the LTE network as UL Grant to the terminal. That is, step 307 is re-performed.

As the base station interacts with the WT through a standardized interface, when the network parameter of the WLAN changes, the base station can acquire the changed network parameter of the WLAN in time, and determines the amount of data transmitted by the terminal through the LTE network and the amount of data transmitted by the terminal through the WLAN according to the network parameter of the LTE and the changed network parameter of the WLAN.

It should be noted that the above steps 301, 302, and 309-312 may be separately implemented as a method embodiment at the terminal side, and steps 303-308 and step 313 may be separately implemented as a method embodiment at the base station side.

In summary, according to the data transmission method provided in the present disclosure, the terminal sends the amount of the data in the data packet required to be uploaded and information about the WLAN AP connected with the terminal to the base station. The base station determines the amount of the data transmitted by the terminal through the LTE network according to the information sent by the terminal, and feeds back the determined amount of the data to the terminal, and the terminal simultaneously transmits the data required to be transmitted on the LTE network and the WLAN according to the data fed back from the base station. Thus, the problem that the terminal cannot determine the amount of data to be transmitted via the LTE network and the amount of data to be transmitted via the WLAN when updating data is solved. Therefore, when updating data every time, the terminal can determine the amount of data to be transmitted via the LTE network and the amount of data to be transmitted via the WLAN according to the actual situation.

In addition, when at least one of the network parameter of the LTE network and the network parameter of the WLAN changes, the base station redetermines the amount of the data transmitted by the terminal through the LTE network, so that the base station can dynamically adjust the amount of the data to be transmitted via the LTE network and the amount of the data to be transmitted via the WLAN. Therefore, the efficiency of the terminal in data transmission is improved, and meanwhile, the utilization ratio of network resources increases.

Figure 4:
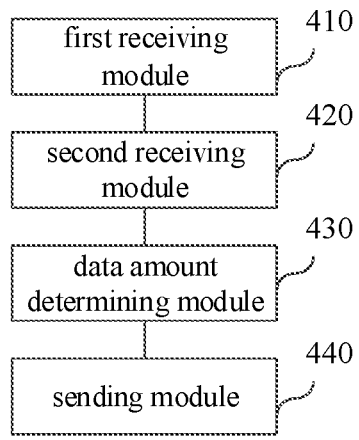
FIG. 4 is a block diagram of a structure of a data transmission device according to an example of the present disclosure.

FIG. 4 shows a block diagram of a structure of a data transmission device according to an embodiment of the present disclosure. The data transmission device may be implemented through software, hardware or a combination thereof to be all or a part of the above base station which can provide the data transmission method. The device includes: a first receiving module 410 configured to receive a buffer status report (BSR) sent by a terminal, the BSR indicating an amount of data required to be transmitted by the terminal; a second receiving module 420 configured to receive information about a currently accessed wireless local area network (WLAN) access point (AP) sent by the terminal, the WLAN AP and the base station belonging to the same network operator; a data amount determining module 430 configured to determine an amount of data transmitted by the terminal through a long term evolution (LTE) network according to the information about the WLAN AP received by the second receiving module 420; and a sending module 440 configured to send a UL Grant to the terminal, where the UL Grant indicates the amount of data transmitted by the terminal through the LTE network, and the terminal is configured to determine the amount of data to be transmitted via the LTE network according to the UL Grant, subtract the amount of data to be transmitted via the LTE network from the amount of data required to be transmitted by the terminal to obtain an amount of data to be transmitted via the WLAN, and transmit data through the LTE network and the WLAN.

In summary, according to the data transmission device provided in the embodiment of the present disclosure, the terminal sends the amount of data in a data packet required to be uploaded and the information about the WLAN AP connected with the terminal to the base station. The base station determines the amount of data transmitted by the terminal through the LTE network according to the information sent by the terminal, and feeds back the determined amount of data to the terminal. The terminal transmits the data required to be transmitted on the LTE network and the WLAN simultaneously according to the data fed back from the base station. Thus, the problem that the terminal cannot determine the amount of data to be transmitted via the LTE network and the amount of data to be transmitted via the WLAN when updating data is solved. Therefore, when updating data every time, the terminal can determine the amount of data to be transmitted via the LTE network and the amount of data to be transmitted via the WLAN according to the actual situation.

Figure 5:
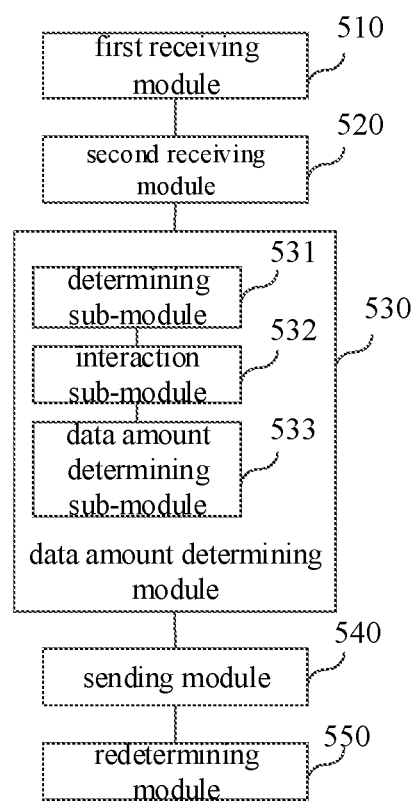
FIG. 5 is a block diagram of a structure of a data transmission device according to another example of the present disclosure.

FIG. 5 shows a block diagram of a structure of a data transmission device according to another example of the present disclosure. The data transmission device may be implemented through software, hardware or a combination thereof to be all or a part of the above base station which can provide the data transmission method. The device includes: a first receiving module 510 configured to receive a buffer status report (BSR) sent by a terminal, the BSR indicating an amount of data required to be transmitted by the terminal; a second receiving module 520 configured to receive information about a currently accessed wireless local area network (WLAN) access point (AP) sent by the terminal, the WLAN AP and the base station belonging to the same network operator; a data amount determining module 530 configured to determine an amount of data transmitted by the terminal through a long term evolution (LTE) network according to the information about the WLAN AP received by the second receiving module 520; and a sending module 540 configured to send a UL Grant to the terminal, where the UL Grant indicates the amount of data transmitted by the terminal through the LTE network, and the terminal is configured to determine the amount of data to be transmitted via the LTE network according to the UL Grant, subtract the amount of data to be transmitted via the LTE network from the amount of data required to be transmitted by the terminal to obtain an amount of data to be transmitted via the WLAN, and transmit data through the LTE network and the WLAN.

Optionally, the information about the WLAN AP at least comprises a WLAN AP identifier. The data amount determining module 530 includes: a determining sub-module 531 configured to determine a WLAN termination (WT) according to the WLAN AP identifier, the WT being configured to provide a network parameter of the WLAN to the base station; an interaction sub-module 532 configured to interact with the WT determined by the determining sub-module 531 through a standardized interface to obtain the network parameter of the WLAN; and a data amount determining sub-module 533 configured to determine the amount of data transmitted by the terminal through the LTE network according to a network parameter of the LTE network and the network parameter of the WLAN obtained by the interaction sub-module 532. The network parameter includes at least one of following parameters: a load and link quality.

Optionally, the network parameter includes the load. The data amount determining sub-module 533 is configured to determine the amount of data transmitted by the terminal through the LTE network according to the relationship between the load of the LTE network and the load of the WLAN. The value of the load is negatively correlated with the amount of the transmitted data.

Optionally, the network parameter includes the link quality. The data amount determining sub-module 533 is configured to determine the amount of data transmitted by the terminal through the LTE network according to the relationship between the link quality of the LTE network and the link quality of the WLAN. The link quality is positively correlated with the amount of the transmitted data.

Optionally, the device further includes: a redetermining module 550 configured to redetermine the amount of data transmitted by the terminal through the LTE network when at least one of the network parameter of the LTE network and the network parameter of the WLAN changes.

In summary, according to the data transmission device provided in the present disclosure, the terminal sends the amount of data in a data packet required to be uploaded and the information about the WLAN AP connected with the terminal to the base station. The base station determines the amount of data transmitted by the terminal through the LTE network according to the information sent by the terminal, and feeds back the determined amount of data to the terminal. The terminal transmits the data required to be transmitted on the LTE network and the WLAN simultaneously according to the data fed back from the base station. Thus, the problem that the terminal cannot determine the amount of data to be transmitted via the LTE network and the amount of data to be transmitted via the WLAN when updating data is solved. Therefore, when updating data every time, the terminal may determine the amount of data to be transmitted via the LTE network and the amount of data to be transmitted via the WLAN according to the actual situation.

In addition, when at least one of the network parameters of the LTE network and the WLAN changes, the base station redetermines the amount of data transmitted by the terminal through the LTE network, such that the base station can dynamically adjust the amount of data to be transmitted via the LTE network and the amount of data to be transmitted via the WLAN. Therefore, the efficiency of data transmission by the terminal is improved, and meanwhile, the utilization ratio of network resources increases.

Figure 6:
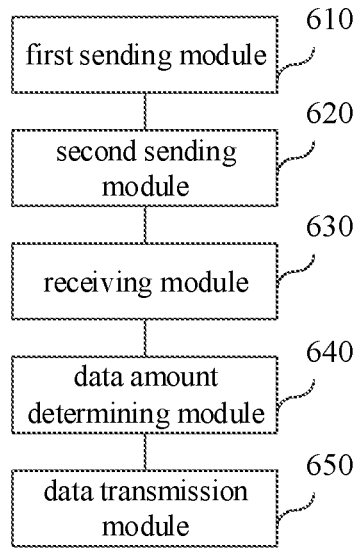
FIG. 6 is a block diagram of a structure of a data transmission device according to an example of the present disclosure.

Referring to FIG. 6, it shows a block diagram of a structure of a data transmission device according to an example of the present disclosure. The data transmission device may be implemented through software, hardware or a combination thereof to be all or a part of the above terminal which can provide the data transmission method. The device includes: a first sending module 610 configured to send a buffer status report (BSR) to a base station, the BSR indicating an amount of data required to be transmitted by the terminal; a second sending module 620 configured to send information about a currently connected wireless local area network (WLAN) access point (AP) to the base station, the WLAN AP and the base station belonging to the same network operator; a receiving module 630 configured to receive a UL Grant sent by the base station, the UL Grant indicating an amount of data transmitted by the terminal through an LTE network; a data amount determining module 640 configured to determine the amount of data to be transmitted via the LTE network and the amount of data to be transmitted via the WLAN according to the UL Grant received by the receiving module 630, where the sum of the amount of data to be transmitted via the LTE network and the amount of data to be transmitted via the WLAN is equal to the amount of data required to be transmitted by the terminal; and a data transmission module 650 configured to transmit data through the LTE network and the WLAN.

In summary, according to the data transmission device provided in the present disclosure, the terminal sends the amount of data in a data packet required to be uploaded and the information about the WLAN AP connected with the terminal to the base station. The base station determines the amount of data transmitted by the terminal through the LTE network according to the information sent by the terminal, and feeds back the determined amount of data to the terminal. The terminal transmits the data required to be transmitted on the LTE network and the WLAN simultaneously according to the data fed back from the base station. Thus, the problem that the terminal cannot determine the amount of data to be transmitted via the LTE network and the amount of data to be transmitted via the WLAN when updating data is solved. Therefore, when updating data every time, the terminal can determine the amount of data to be transmitted via the LTE network and the amount of data to be transmitted via the WLAN according to the actual situation.

FIG. 6, shows a block diagram of a structure of a data transmission device according to another example of the present disclosure. The data transmission device may be implemented through software, hardware or a combination thereof to be all or a part of the above terminal which can provide the data transmission method. The device includes: a first sending module 610 configured to send a buffer status report (BSR) to a base station, the BSR indicating an amount of data required to be transmitted by the terminal; a second sending module 620 configured to send information about a currently connected wireless local area network (WLAN) access point (AP) to the base station, the WLAN AP and the base station belonging to the same network operator; a receiving module 630 configured to receive a UL Grant sent by the base station, the UL Grant indicating an amount of data transmitted by the terminal through an LTE network; a data amount determining module 640 configured to determine the amount of data to be transmitted via the LTE network and the amount of data to be transmitted via the WLAN according to the UL Grant received by the receiving module 630, where the sum of the amount of data to be transmitted via the LTE network and the amount of data to be transmitted via the WLAN is equal to the amount of data required to be transmitted by the terminal; and a data transmission module 650 configured to transmit data through the LTE network and the WLAN.

Optionally, the data amount determining module 640 is further configured to subtract the amount of data transmitted by the terminal through the LTE network from the amount of data required to be transmitted by the terminal to obtain the amount of data to be transmitted via the WLAN.

Optionally, the information about the WLAN AP at least comprises a WLAN AP identifier.

In summary, according to the data transmission device provided in the present disclosure, the terminal sends the amount of data in a data packet required to be uploaded and the information about the WLAN AP connected with the terminal to the base station. The base station determines the amount of data transmitted by the terminal through the LTE network according to the information sent by the terminal, and feeds back the determined amount of data to the terminal. The terminal transmits the data required to be transmitted on the LTE network and the WLAN simultaneously according to the data fed back from the base station. Thus, the problem that the terminal cannot determine the amount of data to be transmitted via the LTE network and the amount of data to be transmitted via the WLAN when updating data is solved. Therefore, when updating data every time, the terminal can determine the amount of data to be transmitted via the LTE network and the amount of data to be transmitted via the WLAN according to the actual situation.

In addition, when at least one of the network parameters of the LTE network and the WLAN changes, the base station redetermines the amount of data transmitted by the terminal through the LTE network, such that the base station can dynamically adjust the amount of data to be transmitted via the LTE network and the amount of data to be transmitted via the WLAN. Therefore, the efficiency of data transmission by the terminal is improved, and meanwhile, the utilization ratio of network resources increases.

An example of the present disclosure provides a data transmission device, capable of implementing the data transmission method provided in the present disclosure. The data transmission device includes: a processor and a memory for storing instructions executable by the processor, where the processor is configured to: receive a buffer status report (BSR) sent by a terminal, the BSR indicating an amount of data required to be transmitted by the terminal; receive information about a currently accessed wireless local area network (WLAN) access point (AP) sent by the terminal, the WLAN AP and a base station belonging to the same network operator; determine an amount of data transmitted by the terminal through a long term evolution (LTE) network according to the information about the WLAN AP; and send a UL Grant to the terminal, where the UL Grant indicates the amount of data transmitted by the terminal through the LTE network, and the terminal is configured to determine the amount of data to be transmitted via the LTE network according to the UL Grant, subtract the amount of data to be transmitted via the LTE network from the amount of data required to be transmitted by the terminal to obtain the amount of data to be transmitted via the WLAN, and transmit data through the LTE network and the WLAN.

An example of the present disclosure provides a data transmission device, capable of implementing the data transmission method provided in the present disclosure. The data transmission device includes: a processor and a memory for storing instructions executable by the processor, where the processor is configured to: send a buffer status report (BSR) to a base station, the BSR indicating an amount of data required to be transmitted by the terminal; send information about a currently connected wireless local area network (WLAN) access point (AP) to the base station, the WLAN AP and the base station belonging to the same network operator; receive a UL Grant sent by the base station, the UL Grant indicating an amount of data transmitted by the terminal through an LTE network; determine the amount of the data to be transmitted via the LTE network and the amount of data to be transmitted via the WLAN according to the UL Grant, where the sum of the amount of data transmitted via the LTE network and the amount of data to be transmitted via the WLAN is equal to the amount of data required to be transmitted by the terminal; and transmit data through the LTE network and the WLAN.

Figure 7:
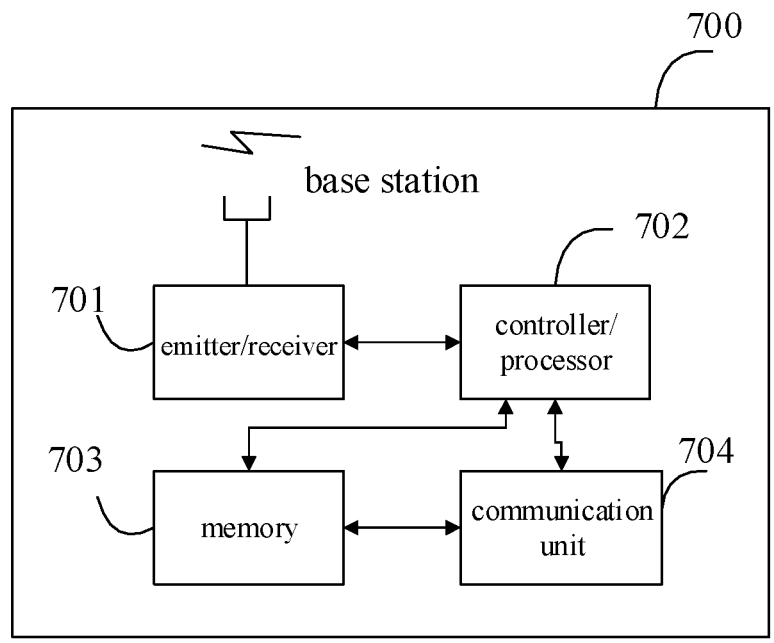
FIG. 7 is a block diagram of a structure of a base station according to an example of the present disclosure.

FIG. 7 is a block diagram of a structure of a base station according to an example of the present disclosure.

The base station 700 includes an emitter/receiver 701 and a processor 702. Here, the processor 702 may also be a controller. FIG. 7 shows "controller/processor 702". The emitter/receiver 701 is configured to support the information transmission and reception between the base station and the terminal described in the above embodiments, and support the radio communication between the terminal and other terminals. The processor 702 performs various functions for communication with the terminal. In the uplink, the uplink signal from the terminal is received through an antenna, demodulated by the receiver 701 (For example, a high-frequency signal is demodulated to be a baseband signal), and then further processed by the processor 702 to recover the business data and signaling information sent by the terminal. In the downlink, the business data and signaling information is processed by the processor 702, and modulated by the emitter 701 (For example, a baseband signal is demodulated to be a high-frequency signal) to generate a downlink signal. The downlink signal is transmitted to the terminal through an antenna. It should be noted that the modulation function or demodulation function may also be completed by the processor 702.

Figure 8:
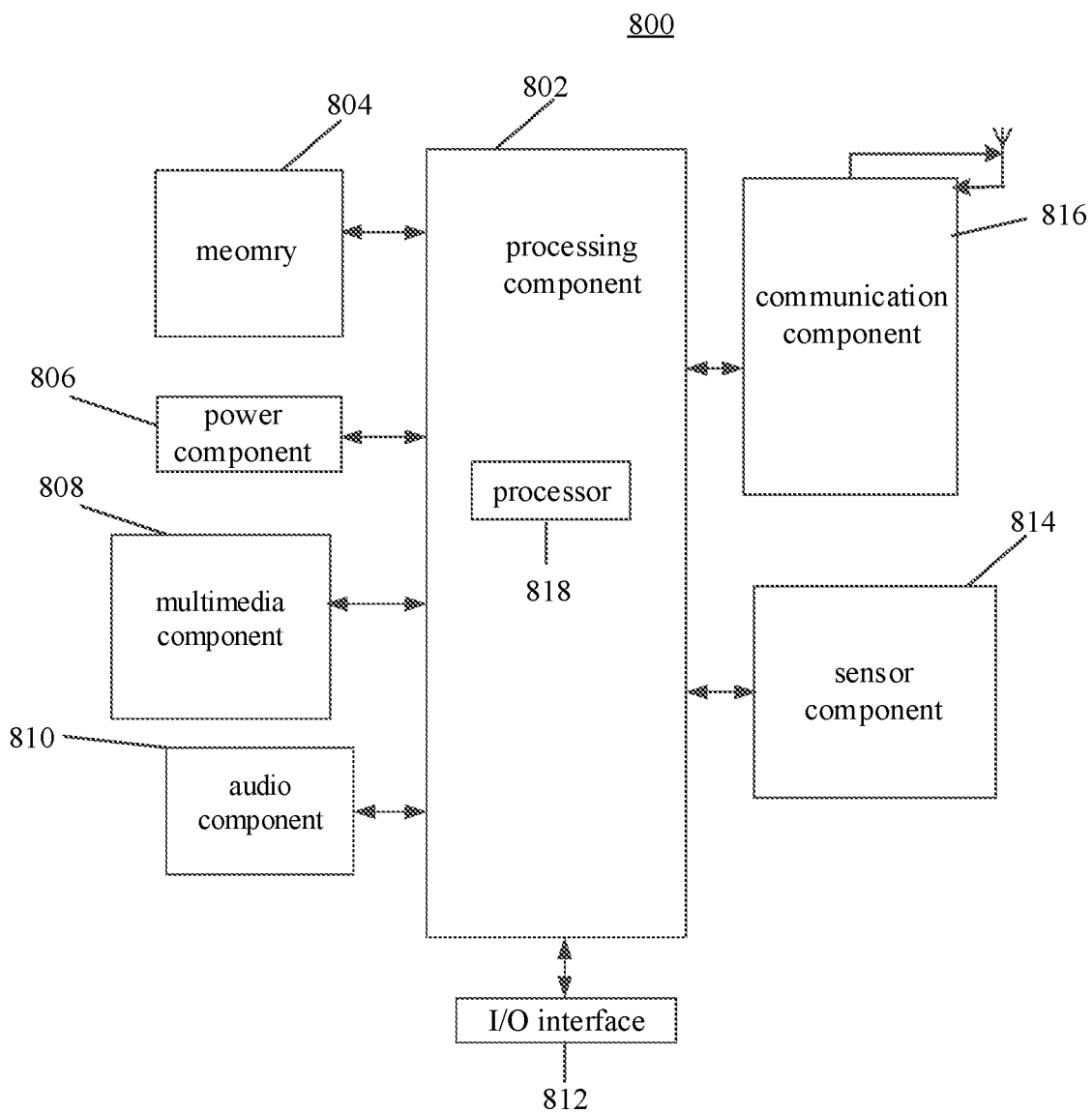
FIG. 8 is a block diagram of a structure of a data transmission device according to an example of the present disclosure.

FIG. 8 is a block diagram of a structure of a data transmission device according to an example of the present disclosure. For example, the device 800 may be a mobile phone, a computer, a digital broadcast terminal, a messaging device, a gaming console, a tablet device, a medical device, fitness equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the device 800, such as the operations associated with display, telephone calls, data communications, camera operations, and recording operations. The processing component 802 may include one or more processors 818 to execute instructions to complete all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, videos, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 808 includes a front camera and/or a rear camera. The front camera and the rear camera may receive external multimedia data while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive external audio signals when the device 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, a button, and the like. The buttons may include, but are not limited to, a home button, an amount button, a start button, and a lock button.

The sensor component 814 includes one or more sensors to provide status assessments of various aspects of the device 800. For instance, the sensor component 814 may detect an on/off status of the device 800, relative positioning of components, e.g., the display and the mini keypad of the device 800, and the sensor component 814 may also detect a position change of the device 800 or a component of the device 800, presence or absence of user contact with the device 800, orientation or acceleration/deceleration of the device 800, and temperature change of the device 800. The sensor component 814 may include a proximity sensor configured to detect the presence of nearby objects without any physical contact. The sensor component 814 may also include a light sensor, such as a CMOS or CCD image sensor, used for imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wirelessly communication between the device 800 and other devices. The device 800 can access a wireless network based on a communication standard, such as Wi-Fi, 2G, or 3G, or a combination thereof. In an example, the communication component 816 receives broadcast signals or broadcast associated information from an external broadcast management system via a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 800 may be implemented with one or more circuitries including: application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Each module or sub-module may be implemented using one or more of the above circuitries.

In examples, there is further provided a non-transitory computer-readable storage medium including instructions, such as the memory 804 including instructions executable by the processor 818 in the device 800 for performing the above-described data transmission methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A data transmission method applied to a base station, the method comprising:
   receiving a buffer status report (BSR) sent by a terminal, the BSR indicating an amount of data required to be transmitted by the terminal;
   receiving information about a currently accessed wireless local area network (WLAN) access point (AP) sent by the terminal, the WLAN AP and the base station belonging to the same network operator;
   determining, by the base station, an amount of data transmitted by the terminal to the base station through a long term evolution (LTE) network according to the received information about the WLAN AP using a standardized interface, wherein the amount of data transmitted by the terminal is determined by using a network parameter of the WLAN when the network parameter of the WLAN is changed and is acquired by the base station, wherein the network parameter of the WLAN that is used to determine the amount of data transmitted by the terminal when the network parameter of the WLAN is changed and is acquired by the base station comprises both a load and link quality; and
   sending an Uplink Grant (UL Grant) to the terminal, wherein the UL Grant indicates the amount of data transmitted by the terminal through the LTE network, and the terminal is configured to determine the amount of data to be transmitted via the LTE network according to the UL Grant, subtract the amount of the data to be transmitted via the LTE network from the amount of the data required to be transmitted by the terminal to obtain an amount of data to be transmitted via a WLAN; and transmit data through the LTE network and the WLAN,
   wherein the information about the WLAN AP at least comprises a WLAN AP identifier; and
   determining the amount of data transmitted by the terminal through the LTE network according to the information about the WLAN AP comprises:
      determining a WLAN termination (WT) according to the WLAN AP identifier, the WT being configured to provide the network parameter of the WLAN to the base station:
      interacting with the WT through the standardized interface to obtain the network parameter of the WLAN, and
      determining the amount of data transmitted by the terminal through the LTE network according to a network parameter of the LTE network and the network parameter of the WLAN, the network parameter comprising the load and the link quality.

2. The method of claim 1, wherein the network parameter comprises the load; and
   determining the amount of data transmitted by the terminal through the LTE network according to the network parameter of the LTE network and the network parameter of the WLAN comprises:
      determining the amount of data transmitted by the terminal through the LTE network according to a relationship between the load of the LTE network and the load of the WLAN, a value of the load being negatively correlated with the amount of the transmitted data.

3. The method of claim 1, wherein the network parameter comprises the link quality; and
   determining the amount of data transmitted by the terminal through the LTE network according to the network parameter of the LTE network and the network parameter of the WLAN comprises:
      determining the amount of data transmitted by the terminal through the LTE network according to a relationship between the link quality of the LTE network and the link quality of the WLAN, the link quality being positively correlated with the amount of the transmitted data.

4. The method of claim 1, further comprising:
   redetermining an amount of data transmitted by the terminal through the LTE network when at least one of the network parameter of the LTE network and the network parameter of the WLAN changes.

5. A data transmission method applied to a terminal, the method comprising:
   sending a buffer status report (BSR) to a base station, the BSR indicating an amount of data required to be transmitted by the terminal;
   sending information about a currently connected wireless local area network (WLAN) access point (AP) to the base station, the WLAN AP and the base station belonging to the same network operator;
   receiving an Uplink Grant (UL Grant) sent by the base station, the UL Grant indicating an amount of data transmitted by the terminal through an LTE network;
   determining, by the base station, the amount of data to be transmitted via the LTE network according to the information about the WLAN AP using a standardized interface and an amount of data to be transmitted via the WLAN according to the UL Grant, wherein the amount of data transmitted by the terminal is determined by using a network parameter of the WLAN when the network parameter of the WLAN is changed and is acquired by the base station, wherein the network parameter of the WLAN that is used to determine the amount of data transmitted by the terminal when the network parameter of the WLAN is changed and is acquired by the base station comprises both a load and link quality, and wherein a sum of the amount of data to be transmitted via the LTE network and the amount of data to be transmitted via the WLAN is equal to the amount of data required to be transmitted by the terminal to the base station; and
   transmitting data through the LTE network and the WLAN,
   wherein the information about the WLAN AP at least comprises a WLAN AP identifier; and the information about the WLAN AP is configured to enable the terminal to determine the amount of data transmitted through the LTE network by:
      determining a WLAN termination (WT) according to the WLAN AP identifier, the WT being configured to provide the network parameter of the WLAN to the base station;
      interacting with the WT through the standardized interface to obtain the network parameter of the WLAN; and determining the amount of data transmitted by the terminal through the LTE network according to a network parameter of the LTE network and the network parameter of the WLAN, the network parameter comprising the load and the link quality.

6. The method of claim 5, wherein determining the amount of data to be transmitted via the WLAN according to the UL Grant comprises:
subtracting the amount of data transmitted by the terminal through the LTE network from the amount of data required to be transmitted by the terminal to obtain the amount of data to be transmitted via the WLAN.

7. A data transmission device, comprising:
a processor; and
a memory for storing instructions executable by the processor;
wherein the processor is configured to perform acts comprising:
receiving a buffer status report (BSR) sent by a terminal, the BSR indicating an amount of data required to be transmitted by the terminal;
receiving information about a currently accessed wireless local area network (WLAN) access point (AP) sent by the terminal, the WLAN AP and the data transmission device belonging to the same network operator;
determining, by a base station, an amount of data transmitted by the terminal to the base station through a long term evolution (LTE) network according to the received information about the WLAN AP using a standardized interface, wherein the amount of data transmitted by the terminal is determined by using a network parameter of the WLAN when the network parameter of the WLAN is changed and is acquired by the base station, and wherein the network parameter of the WLAN that is used to determine the amount of data transmitted by the terminal when the network parameter of the WLAN is changed and is acquired by the base station comprises both a load and link quality; and
sending an Uplink Grant (UL Grant) to the terminal, wherein the UL Grant indicates the amount of data transmitted by the terminal through the LTE network, and the terminal is configured to determine the amount of data to be transmitted via the LTE network according to the UL Grant, subtract the amount of the data to be transmitted via the LTE network from the amount of the data required to be transmitted by the terminal to obtain an amount of data to be transmitted via a WLAN; and transmit data through the LTE network and the WLAN,
wherein the information about the WLAN AP at least comprises a WLAN AP identifier; and
the processor is further configured to:
determine a WLAN termination (WT) according to the WLAN AP identifier, the WT being configured to provide the network parameter of the WLAN to the data transmission device;
interact with the WT determined by a determining sub-module through the standardized interface to obtain the network parameter of the WLAN; and
determine the amount of data transmitted by the terminal through the LTE network according to a network parameter of the LTE network and the network parameter of the WLAN, the network parameter comprising the load and the link quality.

8. The device of claim 7, wherein the network parameter comprises the load; and
the processor is further configured to determine the amount of data transmitted by the terminal through the LTE network according to a relationship between the load of the LTE network and the load of the WLAN, a value of the load being negatively correlated with the amount of the transmitted data.

9. The device of claim 7, wherein the network parameter comprises the link quality; and
the processor is further configured to determine the amount of data transmitted by the terminal through the LTE network according to a relationship between the link quality of the LTE network and the link quality of the WLAN, the link quality being positively correlated with the amount of the transmitted data.

10. The device of claim 7, wherein the processor is further configured to:
redetermine an amount of data transmitted by the terminal through the LTE network when at least one of the network parameter of the LTE network and the network parameter of the WLAN changes.

* * * * *